W. C. HEDGCOCK.
BRAKE MECHANISM.
APPLICATION FILED JULY 5, 1917.
1,283,758.
Patented Nov. 5, 1918.
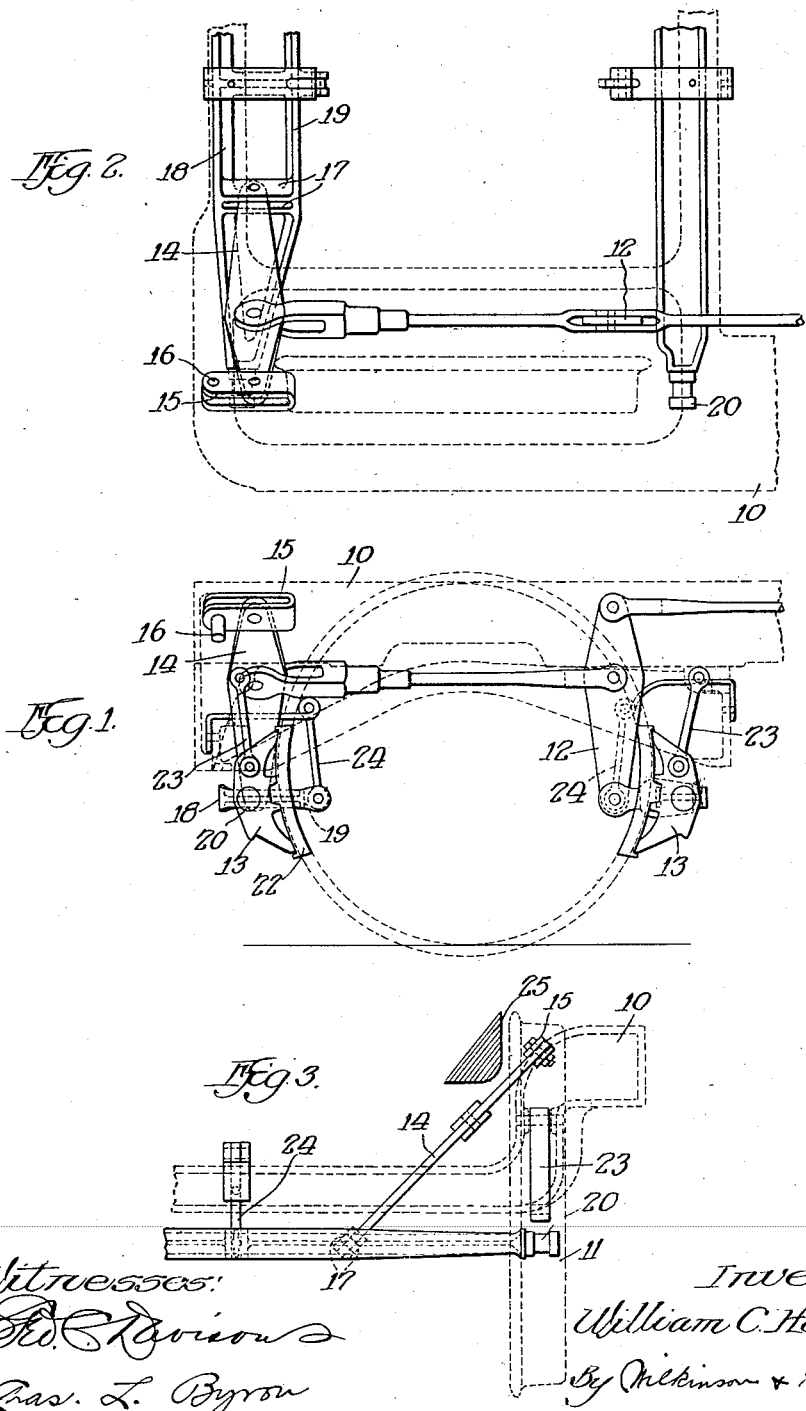
Witnesses:
Inventor
William C. Hedgcock
By Wilkinson & Huxley
Attys

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

1,283,758.

Specification of Letters Patent.

Patented Nov. 5, 1918.

Application filed July 5, 1917. Serial No. 178,585.

*To all whom it may concern:*

Be it known that I, WILLIAM C. HEDGCOCK, a citizen of the United States, and resident of Chicago, in the county of Cook and State of Illinois, have invented certain new and useful Improvements in Brake Mechanism, of which the following is a specification.

This invention relates to brake mechanism, and more particularly to a brake lever arrangement therefor.

One of the objects is to arrange the brake levers to give greater clearance for radial action of the truck and underframe.

Another object is to simplify lever arrangements to meet the various requirements for successful commercial operation.

These and other objects are accomplished by providing in brake mechanism, the combination of a frame, a brake beam carried thereby, a link pivoted to the frame, and an angularly arranged brake lever pivoted to the link and to the brake beam.

The invention is illustrated on the accompanying sheet of drawings, in which,

Figure 1 is a side elevation of a brake equipment embodying my invention;

Fig. 2 is a fragmentary plan view of the same, and

Fig. 3 is a fragmentary end elevation of the arrangement disclosed in Fig. 1.

The various novel features of the invention will be apparent from the following description and drawings, and will be particularly pointed out in the appended claims.

The brake equipment shown is of that type in which is provided a double set of brake levers and connections, one set at each side of a truck 10, carried by wheels, only one 11 of which is shown. The brake equipment at each side of the truck is the same, so only one side is shown and described. To the right of Fig. 1 a supported brake lever 12 is shown, which is operatively connected to a brake head 13 for transmitting a braking movement through the brake head to the wheel 11.

It will be noted that this brake lever is arranged vertically. It is found that there are some disadvantages in having a vertically arranged brake lever at the end of the truck. The brake lever at the end of the truck, known as the "dead" lever, when arranged vertically, many times does not give sufficient clearance for radial action of the truck and underframe 25.

I have overcome the disadvantages of the vertically arranged lever arrangement by providing a brake lever 14 which is angularly arranged with respect to a vertical plane, the upper end of the brake lever being pivotally mounted in an angularly arranged link 15, which in turn is pivotally connected by a pin 16 to the truck frame 10. In this way the use of the usual large heavy bracket, which is necessary to extend out and connect with the lever where the vertical levers are used, is eliminated. The lower end of the brake lever 14 is pivotally connected between two spaced members 17, which together, comprise a lever fulcrum. The lever fulcrum acts as a spacer between the compression member 18 and the tension member 19 of the brake beam. At the outer ends of the brake beam trunnions 20 are provided, each of which receives a brake head 13 having a shoe 22, which is adapted to frictionally engage a wheel 11. The hangers 23 and 24 assist in holding the brake mechanism in a suspended position and in proper alinement. By means of this lever arrangement, wherein the brake lever is laterally inclined, I have provided more clearance for radial action of the truck and underframe or draft gear, which in some cases is limited especially when the truck swivels as in rounding a curve. At the same time I have provided an arrangement whereby the anchoring point for the dead lever is more conveniently located on the truck frame than usually is the case.

There may be various modifications of the invention, and it is my intention to cover all such modifications which do not involve a departure from the spirit and scope of the invention as set forth in the following claims.

I claim:

1. In brake mechanism, the combination of a truck frame, a brake beam having angularly arranged lever fulcrums carried thereby, and laterally extending brake levers pivoted to the brake beam and to the truck frame.

2. In brake mechanism, the combination of a truck frame, links pivoted to the frame, a brake beam carried by the frame and having angularly arranged brake fulcrums, and inclined laterally extending brake levers pivotally connected to the brake beam and to the links.

3. In brake mechanism, the combination of a truck frame, a brake beam carried thereby and having spaced members with lever fulcrums therebetween, links pivotally connected to the frame, and a pair of inclined laterally extending brake levers, the upper ends of which are pivotally connected to said links and the lower ends of which are pivotally connected to the lever fulcrums of the brake beam.

4. In brake mechanism, the combination of a truck frame, a brake beam carried thereby and having spaced members with lever fulcrums therebetween, links pivotally connected to the frame, a pair of inclined laterally extending brake levers, the upper ends of which are pivotally connected to said links and the lower ends of which are pivotally connected to the lever fulcrums of the brake beam, and supporting means for maintaining the brake beam in alinement.

Signed at Chicago, Illinois, this 30th day of June, 1917.

WILLIAM C. HEDGCOCK.

Witnesses:
AMANDA F. WADE,
CHAS. L. BYRON.

Copies of this patent may be obtained for five cents each, by addressing the "Commissioner of Patents, Washington, D. C."